June 25, 1968 C. R. BUSH ET AL 3,389,924
TURNBUCKLE
Filed Nov. 10, 1965
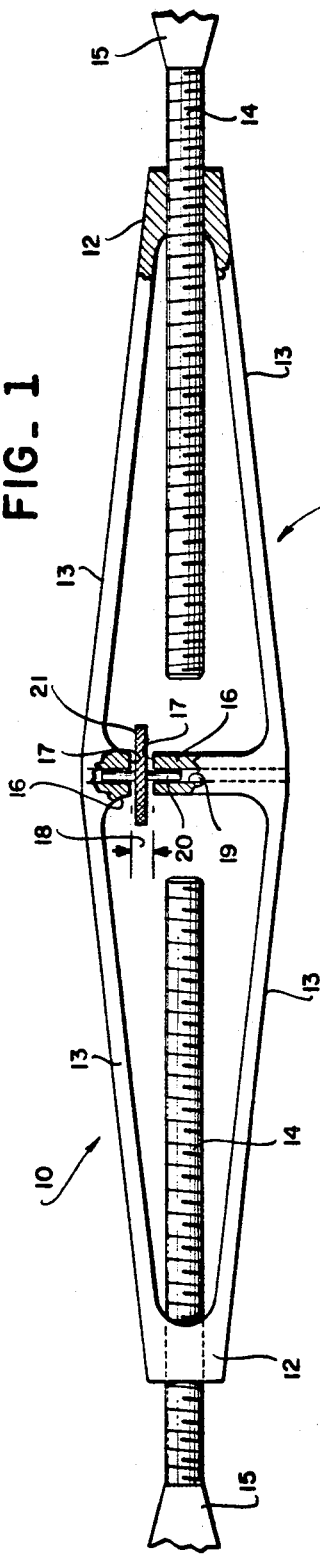
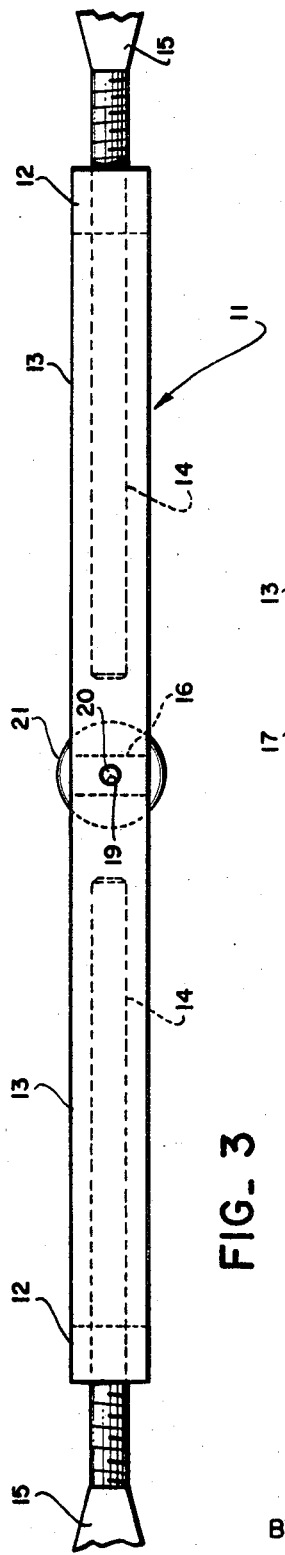
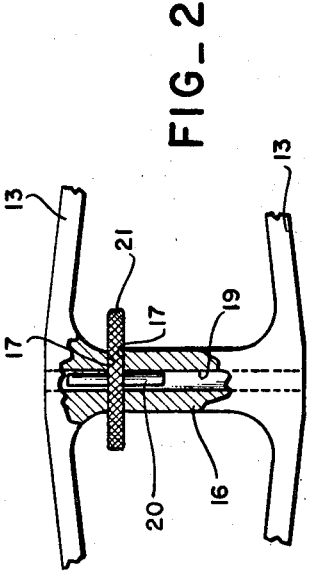
INVENTORS
CHARLES R. BUSH
WILLIAM C. COOK
BY George Sullivan
Agent

United States Patent Office 3,389,924
Patented June 25, 1968

3,389,924
TURNBUCKLE
Charles R. Bush, Smyrna, and William C. Cook, Marietta, Ga., assignors to Lockheed Aircraft Corporation, Los Angeles, Calif.
Filed Nov. 10, 1965, Ser. No. 507,175
3 Claims. (Cl. 287—60)

ABSTRACT OF THE DISCLOSURE

A turnbuckle incorporating a sensing wheel between axially aligned posts at the midpoint of interconnected straps senses precisely a predetermined tension. Tension is adjusted by rotating the turnbuckle until a slight wheel drag is felt. Since visual reference is not required, an over and under tension condition can be detected and corrected with the turnbuckle located anywhere it can be reached with one hand.

---

This invention relates to tensioning devices or turnbuckles and more particularly to a turnbuckle that is adjustable to a predetermined tension value without requiring visual reference and thereafter forms in effect an integral fixed length part under increased applied tension.

In many applications it is required that tension members such as stays, rods, cables, etc., be placed under known or prescribed tensile loads. The conventional turnbuckle is incapable of such precision and tensiometers of various types and designs have been employed in conjunction with standard turnbuckles or equivalent connectors. This requires checking and rechecking of the tensiometer during initial adjustment of the turnbuckle as well as subsequently during service to assure that the original and intended adjustment is maintained. Moreover, the tensiometer must be accessible to view.

The present invention is primarily directed to those cases where a known or prescribed tension is to be applied to a rod or cable and proposes a reliable, relatively uncomplicated and inexpensive tensioning device or improved turnbuckle capable of precision setting. In essence, therefore, it is herein proposed to modify the conventional turnbuckle to incorporate tension setting means having a known predetermined value.

This turnbuckle is characterized by the fact that it permits tension adjustment of the rod or cable to the prescribed extent without requiring any visual reference whereby it has utility in "blind" installations. Also, it includes a single moving part which through design and construction is incapable of being stressed beyond the proportional limit of the turnbuckle material. Hence, the designed calibration or setting at the time of manufacture does not vary with use and environmental conditions which usually make subsequent recalibration necessary. At the same time, slack or the loss of tension in the cable through use is readily removed by readjustment of the turnbuckle as before where it will always permit the adjustment to the designed setting.

The above and other objects will become more apparent with the description which follows when read in conjunction with the accompanying drawings wherein a preferred embodiment of the invention is illustrated and wherein:

FIGURE 1 is a side elevation of the proposed turnbuckle showing it operatively connected in the length of a cable or guy prior to being tightened whereby the cable is placed under the preselected tension;

FIGURE 2 is a similar view of a fragment thereof to show the tension regulating component of the turnbuckle after it is tightened and the preselected tension is applied to the cable; and FIGURE 3 is a plan view of the turnbuckle shown in FIGURE 1.

Referring more particularly to the drawings, 10 designates a turnbuckle constructed in accordance with the teachings hereof. This turnbuckle 10 is formed by a body 11 terminating at opposite ends in lugs 12 interconnected by a pair of spaced integral straps 13 offset at their midpoint to form substantially a diamond when viewed from the side. The lugs 12 are pierced by threaded openings having opposite hand threads each adapted to receive and coact with a complementary threaded fitting 14 forming an extension on the associated end of a cable 15. The cable ends 15 are thus interconnected by the turnbuckle 10 which thereby constitutes an integral part of the cable assembly.

Integrally formed or otherwise attached to and projecting from the adjacent surface of each strap 13 at its mid-point is a post 16. The posts 16 are axially aligned and terminate in adjacent end faces 17 normally disposed in spaced relation establishing a gap 18 therebetween of precise dimension for reasons to become more apparent. An axial hole 19 pierces each post 16 whereby to receive the ends of the pin 20 to which a wheel or disk 21 is concentrically secured medially thereof. The pin 20 has a transverse dimension slightly less than that of the holes 19 so as to be slidable therein with little or no restriction. The thickness of the wheel 21 is less than the gap 18 by a preestablished amount when the posts 16 are disposed in their normal position with their faces 17 apart.

In view of the foregoing construction and arrangement, when the body 11 of the turnbuckle 10 is rotated in one direction the fittings 14 are drawn toward each other increasing tension in the cable 15. As this tension is increased, the gap 18 closes until opposite faces of the wheel 21 are contacted by the end faces 17 of the post 16. A friction drag can be felt when the wheel 21 which is preferably knurled is rotated with the fingers. A free wheel 21 indicates insufficient tension while a tight wheel 21 indicates excessive tension and a lightly dragging wheel 21 indicates the correct tension.

With the turnbuckle 10 thus tightened, any subsequent overload condition in the tension of the cable 15 clamps the wheel 21 between the end faces 17 of the post 16. the resulting compression load is thus carried directly through the wheel 21 which merely acts as a spacer. The tension in the cable 15 may be verified at any time it is not in use by turning the knurled wheel 21 by hand to sense the slight friction drag indicating correct tension.

While a particular embodiment is herein illustrated and described, various changes and modifications will be apparent to those skilled in the art without departing from the above teachings. All such modifications and equivalents are intended to be covered by the appended claims which alone define the invention.

What is claimed is:
1. A turnbuckle comprising a body having a threaded lug at each end thereof adapted to receive one complementary end of a tension member, a pair of spaced, integral straps interconnecting said lugs, said straps being offset at their mid-point to form substantially a diamond, a post carried by each strap at said mid-point, said posts being axially aligned and separated by a precision gap, and a friction drag wheel mounted in said gap.

2. A turnbuckle comprising a body having lugs with opposite hand threads at its opposed ends adapted to receive complemental ends, respectively, of a tension member, a pair of spaced, integral straps interconnecting said lugs, said straps being separated by a precision gap, and a sensing wheel having a predetermined thickness mounted transversely of said gap.

3. The turnbuckle of claim 2 wherein said gap is defined by adjacent faces of said straps at the center thereof and said wheel is carried by a pin, the opposite ends of which are freely slidable in said faces.

References Cited

UNITED STATES PATENTS

| | | | |
|---|---|---|---|
| 645,810 | 3/1900 | Hennessy | 287—60 |
| 1,490,091 | 4/1924 | Carver | 287—60 |
| 2,227,609 | 1/1941 | Troman | 287—59 |
| 2,376,037 | 5/1945 | Davies et al. | 73—143 |
| 3,073,155 | 1/1963 | Ianuzzi. | |
| 3,121,328 | 2/1964 | Todd et al. | 73—143 |
| 3,240,057 | 3/1966 | Ormond. | |

EDWARD C. ALLEN, *Primary Examiner.*

CARL W. TOMLIN, *Examiner.*

A. KUNDRAT, *Assistant Examiner.*